US006963886B2

(12) United States Patent
Van Der Vleuten

(10) Patent No.: US 6,963,886 B2
(45) Date of Patent: Nov. 8, 2005

(54) STORING DATA ITEMS ON A DATA CARRIER

(75) Inventor: Renatus Josephus Van Der Vleuten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 617 days.

(21) Appl. No.: 10/056,365

(22) Filed: Jan. 25, 2002

(65) Prior Publication Data

US 2002/0101678 A1 Aug. 1, 2002

(51) Int. Cl.[7] .............................................. G06F 12/30
(52) U.S. Cl. .......................................... 707/205; 707/2
(58) Field of Search ................................ 707/205, 204, 707/101, 103 R, 2; 709/203, 233; 711/165; 710/11; 386/95; 455/588

(56) References Cited

FOREIGN PATENT DOCUMENTS

EP 0999706 5/2000 ............ H04N 7/00

*Primary Examiner*—Diane D. Mizrahi

(57) ABSTRACT

The invention provides storing data items on a data carrier provided with a file system using sectors, wherein a data file is provided representing a data item, the data file being composed of blocks of mutually varying degrees of significance, wherein said blocks are of a length corresponding to a length of a sector of said data carrier, available sectors and present data files on said data carrier are evaluated, and if the available sectors on said data carrier suffice for containing said data file then said data file is stored on said data carrier, and if the available sectors on said data carrier do not suffice for containing said data file then blocks of present data files are removed from said data carrier based on the significance of the respective blocks and consequently storing at least part of said data file on said data carrier, and the file system is updated to take into account the storing of the blocks of the new data file and the removing of the blocks of present data files.

14 Claims, 1 Drawing Sheet

STORING DATA ITEMS ON A DATA CARRIER

Figure 1:
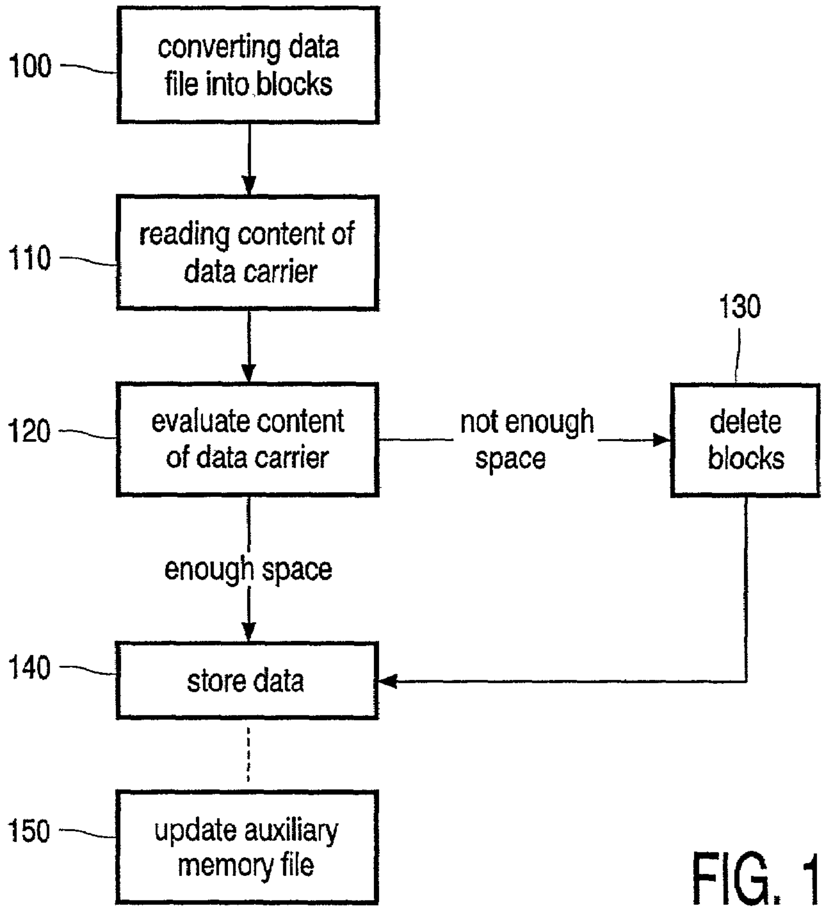

The invention relates to a method for storing data items on a data carrier.

For storing data items such as digital video, audio and images on a storage medium with a fixed capacity, elastic storage is a very efficient way of utilizing the storage capacity of the medium. The principles of elastic storage are described in the non pre-published European patent application no. 00200890.2 of the applicant, titled "Compressed storage of data items". According to the elastic storage principle a digital data item to be stored is first divided into successive data pieces of decreasing significance. Consecutively, the data pieces are stored in a memory provided there is enough space to accommodate all the pieces. In case the memory does not have enough space, space is created by removing from the memory those data pieces from various items that have the lowest significance. The thus freed space is used for storing the data pieces of the data item to be stored. Preferably, an auxiliary memory is used for recording the identification data, such as file name and significance, of all the data pieces stored in the memory.

For reading information which has been stored on the storage medium using the aforementioned method of elastic storage (the storage medium also called elastic memory), a decoding device for decoding the elastic memory format is needed to detect and consequently retrieve and reconstruct the data items on the carrier. If the storage medium is an exchangeable data carrier, such as a diskette or CD-RW, the receiver of this carrier needs a special elastic storage decoding device to read the contents of the carrier. This limits the distribution of this kind of data carrier, to receivers with a dedicated decoding device.

An object of the invention is to increase an exchangeability of an elastic memory. To this end, the invention provides a method for storing, an encoder, a computer program product, and a data carrier as defined in the independent claims. Particularly advantageous elaborations of the invention are set forth in the dependent claims.

According to a first embodiment of the invention, by using the elastic storage principle to store data within the file system on the data carrier, the fixed storage capacity is used most efficiently. Because the data files are arranged on the data carrier in a standard file format for that data carrier, no special decoding device is needed to extract any file from the data carrier. Therefore the data carrier with data stored using the invention can be read by any machine suitable for reading the data carrier, so that exchangeability is greatly increased. The receiver need not be aware of the fact that an elastic memory is used, which extends the range of applications of elastic memories and may increase the speed of market introduction and acceptance. The invention is especially advantageous when applied in applications which use an exchangeable medium with a standardized file system for exchange or distribution of multi-media for which standardized scalable compression methods are available. Currently such standards are being developed for images in JPEG2000 and for video in MPEG4-FGS and Motion JPEG2000. Such advantageous applications include digital still cameras, digital video recorders etc.

Preferably, the blocks of the file to be stored are also taken into account during the evaluation, and if required, the least significant blocks of the file are discarded and not stored.

Figure 2:
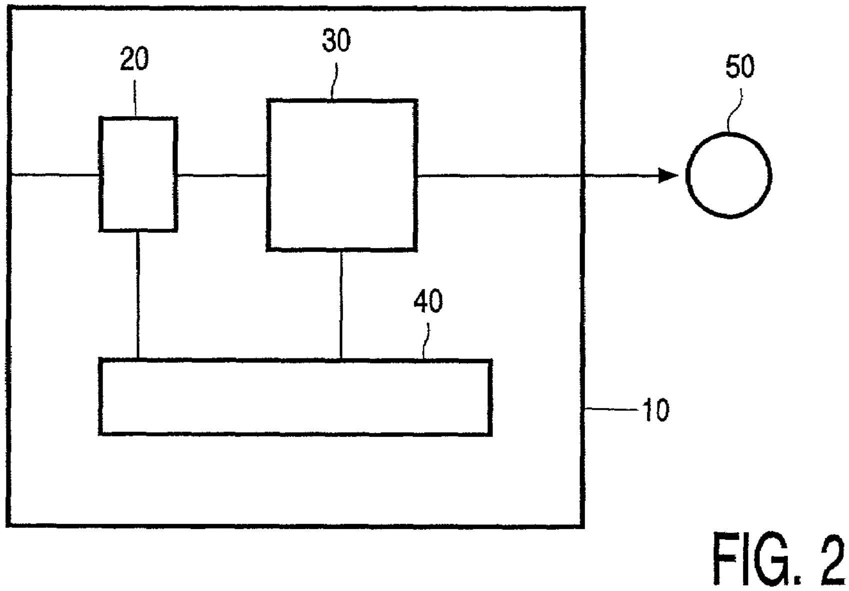

Further objects, elaborations, modifications, effects and details of the invention appear from the following description, in which reference is made to the drawings, in which FIG. 1 is a flow chart of a method according to the invention, and FIG. 2 shows schematically a device according to the invention.

The invention relates to the storage and retrieval of digital information, using exchangeable data carriers. Exchangeable data carriers are known and used for exchange and distribution of multi-media data, such as for example diskette, CD-RW, DVD+RW, Minidisk, ATA Flash Card, and memory stick. The digital information to be stored relates in particular to information for multimedia use such as digital images, video and audio. The invention is not limited to readable and writeable media, but can also be used for write once media such as CD-R and read only media such as CD and DVD. In such an application, the elastic memory may be generated off-line and then distributed, e.g. by copying the elastic memory from a writeable medium to a read-only medium.

In the following an example embodiment of the invention will described using an a readable, writable and exchangeable data carrier, such as a diskette, CD-RW, DVD+RW, Minidisk, ATA Flash Card, or memory stick. The information to be stored on the data carrier is in the form of digital data items, each item representing a unit of information to be stored, for example a digital image.

Data is stored on the data carrier using a writing device, adapted to handle the data carrier used. The writing device is provided with a computer that operates the writing operation. The, writing (and reading) operation is performed using a data file system which manages matter concerning storage and retrieval; such data file systems per se are known in the art. The data carrier is provided with a file system comprising sectors, typically physical sectors of a fixed size, in which sectors information can be stored. The data file system is usually dedicated to the type of data carrier and the sector division of the data carrier. Under the data file system used, information is stored in data files composed of clusters or blocks with a block size either equal to the sector size of the carrier or having a simple relation with the sector size of the carrier, e.g. the number of sectors in a block is a power of 2.

A data item to be stored is converted into a data file composed of blocks of mutually varying degrees of significance, wherein the blocks are of the length determined by the file system, shown as step 100 in FIG. 1. The length of a block corresponds to a length of a sector of the data carrier, as described above i.e. either equal to the sector size of the carrier or having a simple relation with the sector size of the carrier, e.g. the number of sectors in a block is a power of 2.

The blocks into which a data item to be stored on the data carrier is divided form a set of blocks of mutually varying significance. Although usually blocks will have strictly varying significance, it is also possible that some blocks have a same significance. A significance value is assigned to each block, preferably relating to an importance of the information in the block for the reproduction of the data item. Using all blocks of the data file the data item can be retrieved (near) losslessly, i.e. at a quality such that the reproduction is perceptually indistinguishable from the original data item. Starting from the block with the highest significance, the quality of the reproduction of the data item can be improved by consecutively using blocks of lower significance. By using only blocks of higher significance the reproduction of the data item is of a lower, but acceptable quality, but less space is required for storing the data file.

Preferably, the division of the data items is combined with compression of the data item, for example using a bit-rate scalable compression method, wherein the resulting bit-stream is split into blocks of the size determined by the file system. Such scalable compression methods are known in the art, for example such as JPEG2000, MPEG4-FGS, and Motion JPEG2000. Significance data can be easily determined for each block by any suitable known method. Although a scalable coding method is preferred for use with the invention, also other coding methods can be used, provided that these result in coded sections with identifiable significance indications, such as for example hierarchical coding. According to the invention, different scalable compression methods can be mixed. In this case wherein two or more compression methods are used, the receiver must be provided with a decoder for each method used.

Preferably, if the data item is related to a single entity, such a digital picture, the blocks of the data file are arranged in descending order of significance.

To store the data item that has been converted according to the above described method, first the data carrier is inspected (step 110 in FIG. 1) and the available sectors and already present data files on the data carrier are evaluated (step 120 in FIG. 1). If the available sectors on the data carrier suffice for storing all the blocks of the data file are then they are stored on the data carrier (step 140 in FIG. 1).

If the available sectors on the data carrier do not suffice for storing all the blocks of the data file on the data carrier, blocks of already present data files are removed from the data carrier (step 130 in FIG. 1). The sections to be deleted are selected on basis of the significance of the respective blocks, wherein the least significant blocks are deleted first. If the blocks are arranged in order of descending significance, for example as described above with image files, removing the required least significant blocks of the end of the file can be easily performed using a known truncation function, for example the function which is available in many C language implementations under the name truncate( ). If a truncation function is not available, the function can be carried out by direct manipulation of the file system, bypassing the operating system. After deleting enough blocks from the data carry to fit the blocks of the data file, the data file is stored. Preferably, the blocks of the file to be stored are also taken into account during the evaluation, and if required, the least significant blocks of the file are discarded and not stored.

In case the blocks of the files are not arranged in order of descending significance, which is usually the case with files representing video or audio data, which typically comprise multiple scalable objects which are placed in a single file. To remove blocks from the file, sections of the file have to be removed. This can be done with a special function, for cutting blocks out of a file, or directly by bypassing the operating system. In this last case use can be made of the fact that in most file systems file blocks are stored as linked list, such as for example the FAT-chain.

Preferably, an auxiliary memory file is stored on the data carrier, which auxiliary memory contains data file identification information, including significance information, for each data file stored on the data carrier. Using this auxiliary memory file simplifies the task of inspecting the content of the data carrier. To this end, the auxiliary memory file is read during the evaluation of the content of the data carrier.

After storing the data item on the data carrier or making alterations of the content otherwise, the auxiliary memory file is updated to reflect the change of content on the data carrier (step 150 in FIG. 1). The auxiliary memory file can be stored as a hidden file on the data carrier.

To delete a file, the blocks of the file can be simply deleted. If a auxiliary memory is used, the entry of the file to be deleted can be erased or the blocks of the file can be removed from the data carrier. After any deleting action, the auxiliary memory is updated accordingly.

Once data file have been recorded using the above described method on a data carrier, the data carrier can be read by a system provided with a reading device for the respective type of data carrier. Because the data files are arranged on the data carrier in the standard file format for that data carrier, no special decoding device is needed to extract any file from the data carrier. To alter the content of the data carrier, the system needs to be aware of the elastic memory structure; by reading the auxiliary memory file alterations of the content can be carried out, according to the above described method.

A user might delete one or more files stored on a data carrier according to the invention, without being aware of the presence of the elastic memory. Therefore, according to an aspect of the invention, after removing and replacing an exchangeable memory according to the invention, it is checked whether the data in the auxiliary memory file still corresponds to the actual data on the data carrier. This can be done by computing a check sum on the file system data or part of the file system data and storing this check sum in the auxiliary memory. The check can then be carried out by comparing the stored checksum with the actual checksum.

If the auxiliary memory file is missing or corrupted, recreation of the auxiliary memory is preferred (even some data blocks might be deleted to provide room on the medium). This allows for converting a standard medium containing scalable compressed files into an elastic memory. To be able to do this, it should be possible to obtain the respective significances of the respective blocks. These may be estimated from the compressed data, but preferably the respective significances are present in the compressed data itself, e.g. in the form of quality tags incorporated in the bit-stream as proposed in non pre-published U.S. patent application Ser. No. 60/239345 filed on Oct. 11, 2000.

The invention further relates to a device for storing data items on a data carrier 50, as shown in FIG. 2. The device 10 is provided with an input section 20 with which source files can be read, a read/write section 30 for exchangeable data carriers 50, such as for example CD-RW drive or a disk, and a processor 40 connected to the input means 20 and the read/write means 30 for performing the steps of the method according to the invention, for example the steps shown in FIG. 1. The processor 40 is provided with a computer program that when run on the processor performs the steps of the method according to an embodiment of the invention.

The device according to the invention can be, e.g. a consumer product such as a CD-RW player, DVD-R player or Minidisk player.

A sector can be construed as a smallest addressable block in which data can be stored, or a multiple of addressable blocks.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

What is claimed is:

1. A method for storing data items on a data carrier provided with a file system using sectors, the method comprising:

providing a data file representing a data item, the data file being composed of prioritized blocks of data with each block having a mutually varying degree-of significance, wherein said blocks are of a length corresponding to a length of a sector of said data carrier, evaluating available sectors and present data files on said data carrier, if the available sectors on said data carrier suffice for containing said data file then storing said data file on said data carrier, if the available sectors on said data carrier do not suffice for containing said data file then removing blocks of present data files from said data carrier based on the significance of the respective blocks and consequently storing at least part of said data file on said data carrier, and updating the file system to take into account the storing of the blocks of the new data file and the removing of the blocks of present data files.

2. A method according to claim 1, further comprising if the available sectors on said data carrier do not suffice for containing said data file then removing blocks of present data files from said data carrier based on the significance of the respective blocks and discarding at least one of said data file blocks based on the significance of said blocks and consequently storing the remaining blocks of said data file on said data carrier.

3. A method according to claim 1, wherein the data file is provided by converting the data item into the data file by a scalable compression method.

4. A method according to claim 1, further comprising the step of composing an auxiliary memory file with data file identification information, including significance information, for respective data files stored on said data carrier.

5. A method according to claim 4, further comprising the step of storing said auxiliary memory file on said data carrier.

6. A method according to claim 4, wherein the step of evaluating available sectors and present data files on said data carrier includes reading said auxiliary memory file.

7. A method according to claim 4, further including the step of updating said auxiliary memory file after alterations of the content of said data carrier.

8. A method according to claim 4, wherein said auxiliary memory file is stored on the data carrier as a hidden file.

9. A method according to claim 1, comprising the step of converting a given data item into a data file composed of successive blocks of decreasing significance, wherein said blocks are of a length corresponding to a length of a sector of said data carrier.

10. A method according to claim 9, comprising removing blocks of present data files from said data carrier by truncation of selected data files present on said data carrier.

11. Device for storing data items on a data carrier provided with a file system using sectors, the encoder comprising:

input means for providing a data file representing a data item, the data file being composed of prioritized blocks of data with each block having a mutually varying degrees of significance, wherein said blocks are of a length corresponding to a length of a sector of said data carrier, means for evaluating available sectors and present data files on said data carrier, means for storing said data file on said data carrier if the available sectors on said data carrier suffice for containing said data file, means for removing blocks of present data files from said data carrier based on the significance of the respective blocks and consequently storing at least part of said data file on said data carrier if the available sectors on said data carrier do not suffice for containing said data file, and means for updating the file system to take into account the storing of the blocks of the new data file and the removing of the blocks of present data files.

12. Computer program product provided with program code sections to perform the steps of the method according to claim 1, when run on a computer system.

13. Data carrier provided with a file system using sectors, the data carrier comprising data files composed of blocks of mutually varying degrees of significance, wherein said blocks are of a length corresponding to a length of a sector of said data carrier.

14. Data carrier according to claim 13, further comprising an auxiliary memory file with data file identification information, including significance information, for respective data files stored on said data carrier.

* * * * *